United States Patent
Teng et al.

[11] Patent Number: 5,851,423
[45] Date of Patent: Dec. 22, 1998

[54] LIQUID CRYSTAL DISPLAY DEVICES INCORPORATING POLARIZERS COMPRISING LIQUID CRYSTAL POLYMERS

[75] Inventors: Chia-Chi Teng, Piscataway; Hyun Nam Yoon, New Providence; Sunny Shen, Holmdel, all of N.J.

[73] Assignee: Hoechst Celanese Corporation, Warren, N.J.

[21] Appl. No.: 861,548

[22] Filed: May 22, 1997

[51] Int. Cl.$^6$ .......................... C09K 19/00; C09K 19/52; G02F 1/1335
[52] U.S. Cl. ............................ 252/299.1; 252/299.01; 252/299.4; 252/299.67; 428/1; 349/96
[58] Field of Search ................. 252/299.01, 299.1, 252/299.4, 299.67; 428/1; 349/96, 117

[56] References Cited

U.S. PATENT DOCUMENTS

| | | | |
|---|---|---|---|
| 5,576,077 | 11/1996 | Bosma et al. | 428/1 |
| 5,667,719 | 9/1997 | Mortazavi et al. | 252/299.01 |
| 5,672,296 | 9/1997 | Shen et al. | 252/299.01 |
| 5,738,918 | 4/1998 | Shen et al. | 428/1 |
| 5,746,949 | 5/1998 | Shen et al. | 252/585 |

FOREIGN PATENT DOCUMENTS 63-195602  8/1988  Japan.

*Primary Examiner*—Shean C. Wu
*Attorney, Agent, or Firm*—Palaiyur S. Kalyanaraman

[57] ABSTRACT

This invention discloses novel liquid crystal display devices containing polarizers which comprise a liquid crystal polymer and a dichroic absorber. Also disclosed is a process to construct the liquid crystal display devices.

10 Claims, 2 Drawing Sheets

The arrows indicate the direction of the respective layers during the LCD construction.

LIQUID CRYSTAL DISPLAY DEVICES INCORPORATING POLARIZERS COMPRISING LIQUID CRYSTAL POLYMERS

FIELD OF THE INVENTION

This invention relates generally to liquid crystal display devices ("LCDs"). Specifically it discloses LCDs that incorporate polarizers which comprise liquid crystal polymers and dichroic absorbers. The invention disclosed herein is related to that disclosed in pending patent application, Ser. No. 08/460,288, filed Jun. 2, 1995, now U.S. Pat. No. 5,672,296.

BACKGROUND OF THE INVENTION

LCDs are widely used components in applications such as, for example, Notebook Personal Computers (PCs), calculators, watches, liquid crystal color TVs, word processors, automotive instrument panels, anti-glare glasses and the like. A useful review article, for example, is "Digital Displays" by in *Kirk-Othmer Encyclopedia of Chemical Technology*, Third edition, Volume 7, page 726 (1979), Wiley-Interscience Publication, John Wiley & Sons, New York. There are several kinds of LCDs such as, for example, twisted nematic ("TN") devices, supertwisted nematic ("STN") devices, thin film transistor active matrix LCD, ferroelectric LCD, and the like. Many of these are described, for example, by M. G. Clark, "Liquid Crystal Devices", *Encyclopedia of Physical Science and Technology*, second edition, Robert A. Meyers, editor, Academic Press, Inc., New York, Vol. 9, page 41 (1992), as well as in *"Liquid Crystals- Applications and Uses"*, Volumes 1–3, B. Bahadur, ed., World Scientific Publishing Co., River Edge, N.J., 1995.

A typical liquid crystal display device contains three key elements: an input polarizer, a liquid crystal (LC) cell, and an output polarizer. There are glass substrates separating these three elements and providing support for the electrodes of the LC cell as well as containing the liquid crystal material. The polarizers, which are used in the form of film, the polarizer film (also called polarizing film), are typically laminated onto the outside of these glass substrates. The input polarizer ensures that the light entering the LC cell is linearly polarized. The LC cell is designed to allow for a voltage controllable transformation of the input polarization to some other polarization at the output of the LC cell. This light then passes through the output polarizer (or analyzing polarizer). By controlling the polarization of the light passing through this output polarizer the LC cell can control the brightness of the display. Other LCDs (such as reflective displays) operate with somewhat different optical paths, but the polarizers are still required to prepare the polarization of the light input to the LC cell and to allow the LC cell to vary display brightness by changing the polarization of the light passing through it.

The polarizing film traditionally comprises a stretched polymer film such as, for example, polyvinyl alcohol (PVA), a dichroic absorber and other optional layers. The dichroic absorber is usually iodine or a dichroic dye that is absorbed on the polymer film. This arrangement may then be coated or sandwiched on both sides with a substrate such as, for example, polyethylene terephthalate (PET), polymethyl methacrylate (PMMA), triacetyl cellulose (TAC), and the like. This may further be coated with an adhesive layer, protective layer, and the like.

The nature and quality of the polarizing film influences the performance of the device wherein the polarizing film is used. Traditional polarizing films such as stretched PVA are increasingly found to be inadequate in performance. Their limitations have become apparent with increasingly sophisticated applications for polarizers and LCDs. More and more, the environment for use of these materials is becoming increasingly harsher in terms of temperature, humidity and the like. PVA films lack the needed heat and humidity resistance, strength, dependability, ease of use and ease of processing. Furthermore, they frequently suffer from deterioration of optical properties, such as a decrease in polarizing efficiency when exposed to high humidity/heat environment. Because of these deficiencies in the polarizing film, the LCDs incorporating such films are also deficient in their performance, capability, durability and fields of use.

Accordingly, improved LCDs incorporating improved polarizing films are urgently required to satisfy increasingly sophisticated applications.

It is, therefore, an object of this invention to provide novel LCDs.

It is an additional object of this invention to provide LCDs with improved performance suitable for stringent environmental conditions.

It is a further object of this invention to provide improved LCDs incorporating improved polarizers.

Other objects and advantages of the present invention shall become apparent from the accompanying summary, drawings and description.

BRIEF DESCRIPTION OF THE DRAWINGS

The invention is described in detail below with reference to FIG. 1 and FIG. 2. FIG. 1 is an enlarged sectional view of an illustrative TN type device built according to the present invention, while

SUMMARY OF THE INVENTION

Figure 1:
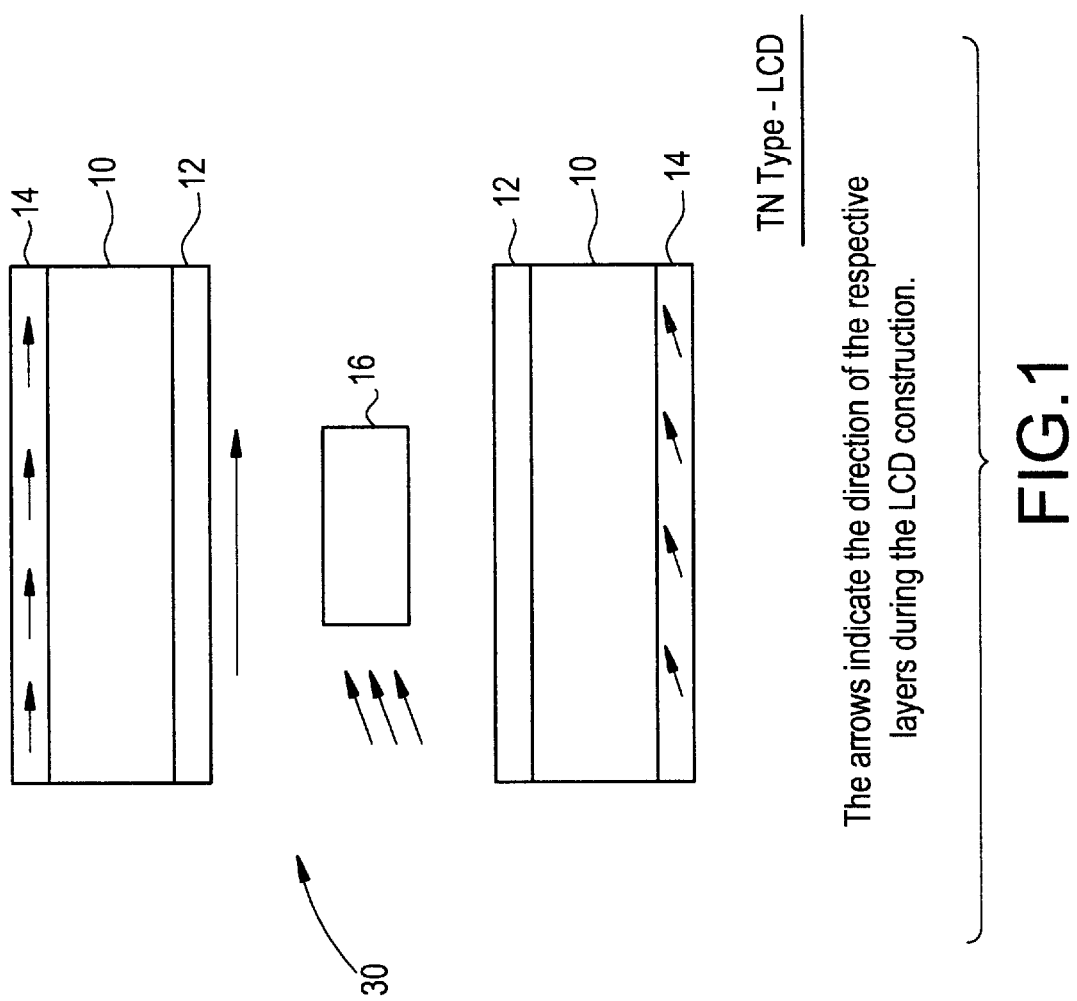

One or more of the foregoing objects are accomplished by the present invention which provides LCDs incorporating polarizer films which films comprise liquid crystal polymers ("LCPs") and dichroic absorbers. The dichroic absorbers may be inorganic materials such as, for example, iodine, or organic dichroic dyes. If they are organic dyes, the polarizer film may comprise blends of the LCP and the dye; alternatively, both the LCP and the dye may be covalently linked parts of the polymer main chain. Suitable LCP-dye blends are disclosed in pending patent application, Ser. No. 08/460,288, cited earlier. Suitable covalently linked LCP-dye polarizers are disclosed in pending application, Ser. No. 08/,561,607 filed Nov. 21, 1995, now U.S. Pat. No. 5,746,949. Typically, the polarizer is included in the LCD in the form of a laminate. Pending patent application, Ser. No. 08/663,764, filed Jun. 14, 1996, now U.S. Pat. No. 5,738,918 describes suitable laminates comprising polarizers which comprise LCPs and dichroic absorbers. The device may additionally contain other optional layers such as, for example, adhesives, dielectrics, spacers, and the like.

The invention also discloses a process to construct LCDs incorporating LCP-based polarizer films.

Description of the Invention

In one embodiment, the present invention teaches an LCD comprising polarizing films which comprise LCPs and dichroic dyes. While many LCPs known in the art, such as, for example, the Vectrao® brand LCP available from Hoechst Celanese Corporation, Somerville, N.J., may be mixed with suitable dyes to prepare polarizer laminates which may then be used in the practice of the invention, preferred LCP-containing polarizing films and laminates comprising such films are disclosed in the pending patent applications cited earlier. A suitable LCP, as disclosed in cited pending application, Ser. No. 08/460,288, may be a polyester, polyamide, polyesteramide, polyketone, polycarbonate, polyurethane, polyether and the like. A preferred LCP is a polyester or a polyesteramide. An illustrative LCP from that pending application comprises repeat units corresponding to the formula:

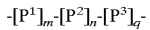

wherein $P^1$ is an aromatic hydroxy monocarboxylic acid or an aromatic amino carboxylic acid; $P^2$ is an aromatic dicarboxylic acid; $P^3$ is a phenolic compound which is other than resorcinol; m, n and q represent mole percent of the respective monomers, with m+n+q totaling 100 mole percent. While m, n, and q may generally range from 5–70% individually, the preferred range of m is about 5–40%, n is about 5–40% and q is about 5–30%. In addition to $P^1$, $P^2$ and $P^3$, additional monomeric moieties such as, for example, a second aromatic amino carboxylic acid moiety or an aromatic hydroxy carboxylic acid moiety $-[P^4]_r$-, a diphenol moiety $-[P^5]_s$which is resorcinol, and any other suitable monomers, may be part of the polymer repeat unit, in which case r is about 5–20 mole %, and s is about 5–20 mole %, with the total m+n+q+r+s being adjusted to be 100 mole % $P^4$ is different from $P^1$ and $P^5$ is different from $P^3$. That pending patent application discloses not only such compositions but also a suitable process to prepare polarizers from such LCPs and suitable dichroic absorbers.

Suitable dichroic absorbers may be inorganic such as, iodine, or organic dichroic dyes. The pending patent application, Ser. No. 08/460,288, discloses several classes of suitable dyes and their selection criteria such as, for example, the wavelength of absorption (which decides the wavelength of use for the resulting LCD), color fastness, thermal stability, moisture stability, solubility in the LCP, direction of the transition moment of the dye (which generally corresponds to the polymer main axis), and the like. Some illustrative dye classes are anthraquinone dyes, indigo dyes, phthalocyanine dyes, acidic dyes, azo dyes, disperse dyes, and the like. That application also discloses a process for preparing a polarizing film from meltblending the LCP and the dye.

The polarizer is used as a polarizer laminate. Suitable polarizer laminates from LCP-based polarizer films are disclosed in pending patent application, Ser. No. 08/663, 764, cited earlier.

Another embodiment of the present invention teaches a process to prepare an LCD comprising polarizers which comprise an LCP and a dichroic absorber. The process is illustrated below using a polarizer disclosed in pending application, Ser. No. 08/460,288.

FIG. 1 is a schematic of a twisted nematic (TN) type LCD 30 constructed according to an embodiment of this invention. The process of construction is illustrated below. It is to be understood that the following description is for illustrative purposes only. Skilled artisans may find slight modifications which should also be construed as being encompassed by the present invention.

First two 1.1 mm glass substrates (10) with conductive coating thereon are prepared by known methods. Techniques to coat substrates with conductive materials are well known in the art. Examples of suitable conducting materials are indium-tin-oxide ("ITO"), zinc oxide, conducting polymers, and the like. A preferred conductive coating is ITO which may be, for example, vacuum deposited or sputtered on to the support layer. The ITO coating has thickness generally in the range 100 Angstroms-1 µm, preferably 200–1,000 Angstroms, and typically 500–1,000 Angstroms. The conductive coating may be substituted by an active matrix transistor too, as is well known in the art. Many conductive material-coated substrates themselves are also commercially available. For example, glass substrates coated with ITO coating (with conductivity of a 100 ohm per square) are available from Donnelley Applied Films, Photran Corp., Lakeville, Minn.; or from Nipelectric Glass Co., Itasca, Ill.; or Thin Film Devices, Inc. Anaheim, Calif. The coated glass substrate is scribed and broken into slides approximately one inch by two inches long by drawing the scribe line on the back (non ITO coated) side of the glass. The substrates may then be cleaned with a mild sodium hydroxide solution followed by rinsing in deionized water.

The ITO layer may then be patterned by suitable techniques such as, for example, lithography. A suitable photoresist such as, for example, the AZ-1515 resist (available from Hoechst Celanese Corporation, Somerville, N.J.) is spincoated at about 3000 rpm for about 30 seconds to cover the ITO coating.

The resist is then baked for about 30 minutes at about 90° C. in a nitrogen purged oven. A small amount of the resist is then washed away from the edge of the patterned ITO electrodes with acetone and a cotton swab. It is then baked an additional 30 minutes at about 100° C. to hard bake the resist. The exposed ITO is then etched for about 175 seconds in an unagitated solution of $H_2O$:HCl (reagent grade, 7%):$HNO_3$ (reagent grade, 70%) in the ratio of 1:1:0.16 by volume. The photoresist is then removed with a suitable stripper such as, for example, the AZ brand photoresist stripper (available from Hoechst Celanese Corporation) or with warm acetone. It is then rinsed in clean, deionized water in an overflow tank with nitrogen agitation for about 60 seconds An alignment layer is then deposited on the conductive coating. Several materials are known for this purpose: both inorganic (e.g., Group IIIB, Group IVA and Group IVB metal compounds such as alkoxides, halides, chelates, acrylates and the like, zirconium acetylacetonate, and the like) and organic (polyimides, polyamides and the like); polyimides are the most preferred. Polyimides ("PIs") are commonly deposited by spin coating from a solution followed by curing and rubbing. The alignment layer has thickness generally in the range 10 Angstroms- 1 µm, preferably 100–1,000 Angstroms, and typically 100–500 Angstroms. A preimidized polyimide ("PI") suitable for TN displays such as, for example the SE-1180 brand polyimide (from Brewer Science, Rolla, Mo.) is spincoated at about 3500 rpm and then baked on a hot plate at about 180° C. for about 45 seconds to form the alignment layer (12). It is then transferred to an oven with dry nitrogen purge at about 220° C. for about 2 hours. The deposited PI films are then rubbed, in the long direction of the substrates, with a synthetic felt cloth by pressing the face of each ITO substrate which has the PI on it against the cloth on a table and pushing the substrate across the felt with a finger.

Two thus-far-built substrates may then be brought together suitably into a sandwich shape, with a suitable spacer in between, so as to create a cell in the middle for the liquid crystal. In order to do that, suitable spacers may be applied to form the cells. For example, a small quantity of a glass fiber spacer (available from EM Industries, Incorporated, Hawthorne, N.Y.) is placed into isopropyl alcohol in a container equipped with a spray aspirator fixture such as an empty perfume bottle. One of the above-described substrates is then sprayed with the spacers. The cell is then glued suitably (e.g. with epoxy resin) together with the spacers. The two substrates are then aligned with the ITO electrodes facing each other and the PI alignment directions at right angles to each other. This results in each glass substrate sticking out about one inch from a central region where it is covered by the spacers and the other glass substrate. A small bead of a suitable UV curing adhesive such as, for example, the Norland company UV curing epoxy adhesive (from Norland Company, New Brunswick, N.J.) is placed along two opposite edges of the overlapping glass regions with a syringe. The cell is then placed in a suitable polyethylene bag which has been fitted with a tube to evacuate the bag. The bag is evacuated and the UV curing adhesive is exposed to a mercury arc-lamp UV source for about 30 minutes to cure the adhesive.

The cell is then filled with a liquid crystal (LC) material (16). For example, a drop of the E17 brand liquid crystal material (available from E. Merck, Darmstadt, Germany) is placed along the un-epoxied edges of the cell. The capillary forces pull the LC material into the cell filling it. Additional beads of the UV curing adhesive are then placed along the two un-epoxied edges. These new beads are then cured in the same way as the earlier beads.

LCP-based polarizers (14) are then placed on glass on both sides by removing the release film from a suitable LCP polarizer laminate (for example, one described in pending patent application, Ser. No. 08/663,764, cited earlier) and then applying the polarizer to the outside of the cell on the first side removing all air bubbles by pressing the film on with a roller. The film aligns with the rubbing direction of the polyimide alignment layer on the same substrate. The other LCP polarizer laminate is then applied to the other side of the cell aligned along the rubbing direction of the polyimide on that side substrate (90 degrees to the direction of the first polarizer). Electrodes are then attached to the ITO contacts by using a small amount of a suitable conducting silver paste to attach magnet write to each electrode and then allowed to dry. This cell transmits light when no voltage is applied. When an A.C. voltage of 10 volts is applied the cell blocks light from being transmitted.

Figure 2:
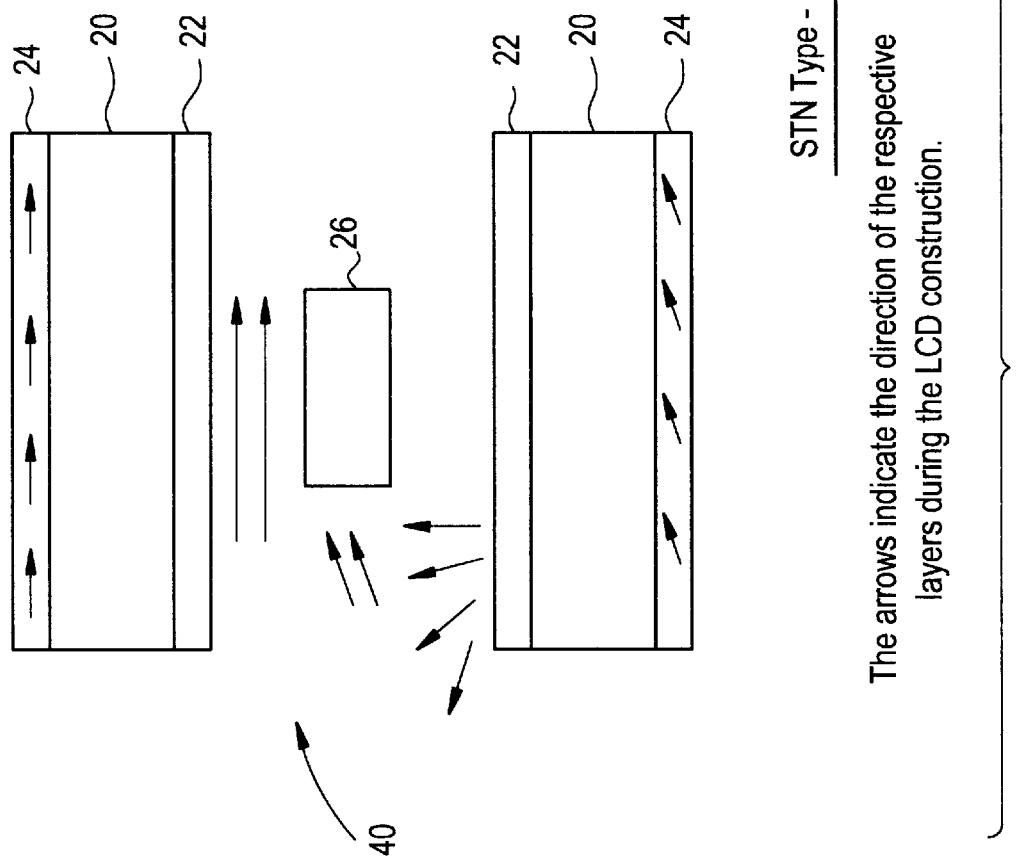
FIG. 2 is an enlarged sectional view of the STN type device built according to the present invention.

The construction of a super twisted nematic ("STN") type LCD 40 (see FIG. 2) may be illustrated as follows. Two ITO-coated glass substrates (20) are prepared, cleaned, patterned, etched and then stripped as described before. A pre-imidized polyimide suitable for alignment layer for an STN type LCD such as, for example, the SE3310 brand polyimide (from Brewer Science), is deposited and cured as before to form the alignment layer (22). The polyimide layer is rubbed, and spacers are provided as described before. To glue the cell with spacers for the LC, the substrates with the ITO electrodes are aligned facing each other with the polyimide alignment directions at right angles to each other. The alignment must also provide for a left handed 270 degree twist of the LC rather than a 90 degree twist. To accomplish this, the direction of the rubbing on each glass slide substrate is carefully oriented. The lower substrate is aligned such that the edge of the slide that is the trailing edge when pushed across the felt is placed to the left-hand side as the slide is laid down. With this alignment of the lower slide, the upper slide is placed such that the edge of the slide that is the trailing edge as it is pushed across the felt is oriented up or above the area where the slides overlap forming the LC cell. This results in each glass substrate sticking out about one inch from a central region where it is covered by the spacers and the other glass substrate. A small bead of the UV curing adhesive described earlier is placed along two opposite edges of the overlapping glass regions with a syringe. The cell is placed in a polyethylene bag which has been fitted with a tube to evacuate the bag. The bag is evacuated and the UV curing adhesive is exposed to a mercury arc-lamp UV source for about 30 minutes to cure the adhesive.

The cell is then filled with LC material (26). A left handed chiral mixture of liquid crystals is made by mixing approximately 1.5% of the ZL1811 brand left handed chiral dopant (available from E. Merck Company) into a compatible nematic liquid crystal mixture also available from E. Merck. The actual concentration of ZL1811 is chosen as to result in a pitch which twists 270 degrees in 4 microns. A drop of this chiral LC mixture is placed along the un-epoxied edges of the cell. The capillary forces pull the LC material into the cell filling it. Additional beads of the UV curing epoxy adhesive are placed along the two un-epoxied edges. These new epoxy beads are cured the same way as the earlier beads.

LCP-based polarizers are then placed on glass on both sides by removing the release film from an LCP polarizer laminate and then applying the polarizer to the outside of the cell on the first side removing all air bubbles by pressing the film on with a roller. The film aligns with the rubbing direction of the polyimide alignment layer on the same glass substrate. The other LCP polarizer laminate is applied to the other side of the cell aligned along the rubbing direction of the polyimide on that side (90 degrees to the direction of the first polarizer).

Electrodes are then attached to the ITO contacts by using a small amount of a suitable conductive silver paste as before. This cell transmits colored light when no voltage is applied. When an A.C. voltage of 10 volts is applied the cell blocks light from being transmitted.

Other additional optional layers may also be included in the construction such as, for example adhesive layer, retardation film, anti-scratch film, phase compensation layer, color filter, and the like. Some of these may be polymeric or glass.

While the above description describes the construction of TN and STN type devices, it is to be understood that other types of devices such as, for example, the thin film transistor active matrix LCD, ferroelectric LCD and the like, may also be constructed in a similar manner.

What is claimed is:

1. A liquid crystal display device comprising a polarizer film, a conductive layer, an alignment layer and a phase compensation layer, wherein said polarizer film comprises a dichroic absorber and a thermotropic liquid crystal polyester, further wherein said polyester comprises repeat units corresponding to the formula:

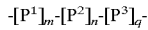

wherein $P^1$, $P^2$ and $P^3$ represent monomeric moieties with $P^1$ being an aromatic hydroxy carboxylic acid, $P^2$ being an aromatic dicarboxylic acid and $P^3$ being a phenol; and m, n and q represent mole percent of the respective monomers ranging from 5–70 mole percent individually.

2. The device of claim 1, wherein said conductive layer is selected from the group consisting of indium-tin-oxide, zinc oxide, conducting polymer, and active matrix transistor.

3. The device of claim 2, wherein said conductive layer is indium-tin-oxide.

4. The device of claim 1, wherein said alignment layer is selected from the group consisting of metal alkoxide, metal halide, metal chelate, metal acrylate, zirconium acetylacetonate, polyimide and polyamide.

5. The device of claim 4, wherein said alignment layer is a polyimide.

6. A process of constructing a liquid crystal display device comprising:

(a) coating a conductive layer on a suitable first substrate;

(b) patterning the coated substrate;

(c) applying an alignment layer on the patterned substrate;

(d) rubbing said alignment layer;

(e) repeating steps (a) through (d) on a suitable second substrate;

(f) applying a spacer material to said first substrate and bringing the two substrates suitably into contact so as to form a sandwich structure with a cell in between;

(g) filling said cell with a liquid crystal material;

(h) applying a polarizer on the two outer surfaces of the sandwich structure and aligning said polarizer with said alignment layer, wherein said polarizer comprises a liquid crystal polyester and a dichroic absorber; and (i) applying electrodes to said conductive layer, further wherein said polyester comprises repeat units corresponding to the formula:

$$-[P^1]_m-[P^2]_n-[P^3]_q-$$

wherein $P^1$, $P^2$ and $P^3$ represent monomeric moieties with $P^1$ being an aromatic hydroxy carboxylic acid $P^2$ being an aromatic dicarboxylic acid and $P^3$ being a phenol; and m, n and q represent mole percent of the respective monomers ranging from 5–70 mole percent individually.

7. The process of claim 6, wherein said liquid crystal display device is of the twisted nematic type.

8. The process of claim 6, wherein said liquid crystal display device is of the supertwisted nematic type.

9. The process of claim 6, wherein said repeat unit further comprises monomeric moieties $-[P^4]_r-$ and $-[P^5]_s-$, wherein $P^4$ represents a second aromatic hydroxycarboxylic acid moiety different from $P^1$, and $P^5$ represents a second phenolic moiety different from $P^3$, with r and s representing mole percent of the respective monomers ranging from 5–20 mole percent individually.

10. The process of claim 9, wherein $P^1$, $P^2$, $P^3$, $P^4$ and $P^5$ are respectively 4-hydroxybenzoic acid, 6-hydroxy-2-naphthoic acid, terephthalic acid, 4,4'-dihydroxybiphenyl and resorcinol in a molar ratio 30:30:20:10:10 respectively.

* * * * *